(12) United States Patent
Takaoka et al.

(10) Patent No.: US 7,099,266 B2
(45) Date of Patent: Aug. 29, 2006

(54) ORTHOGONAL FREQUENCY DIVISION MULTIPLEXED SIGNAL TRANSMITTING APPARATUS, ORTHOGONAL FREQUENCY DIVISION MULTIPLEXED SIGNAL RECEIVING APPARATUS, AND ORTHOGONAL FREQUENCY DIVISION MULTIPLEXED SIGNAL TRANSMITTING/RECEIVING SYSTEM

(75) Inventors: Katsumi Takaoka, Kanagawa-ken (JP); Keiichi Kaneko, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 1071 days.

(21) Appl. No.: 10/102,860

(22) Filed: Mar. 22, 2002

(65) Prior Publication Data

US 2002/0136157 A1 Sep. 26, 2002

(30) Foreign Application Priority Data

Mar. 26, 2001 (JP) ............................ P2001-087800

(51) Int. Cl.
*H04J 9/00* (2006.01)
*H04L 5/04* (2006.01)

(52) U.S. Cl. ............... 370/204; 370/203; 370/205; 370/206; 370/207; 370/208; 370/210; 375/265; 375/267; 375/298; 375/299; 375/318; 375/367

(58) Field of Classification Search ............... None
See application file for complete search history.

(56) References Cited

U.S. PATENT DOCUMENTS 6,044,109 A * 3/2000 Kaku et al. ................. 375/223
6,226,337 B1 * 5/2001 Klank et al. ................ 375/367

FOREIGN PATENT DOCUMENTS

| EP | 0 553 841 A2 | 8/1993 |
| EP | 0 765 059 A2 | 3/1997 |
| EP | 1 065 855 A1 | 1/2001 |
| EP | 1 083 719 A2 | 3/2001 |

* cited by examiner

*Primary Examiner*—Chi Pham
*Assistant Examiner*—Raj Jain
(74) *Attorney, Agent, or Firm*—Nath & Associates PLLC; Gregory B. Kang; Stanley N. Protigal

(57) ABSTRACT

An orthogonal frequency division multiplexed signal transmitting apparatus executes a time-division multiplexing process that inserts a reference signal at a predetermined interval based on reference signal position information into an information signal to be transmitted. The transmitting apparatus generates an orthogonal frequency division multiplexed signal by digital-modulating the time-division multiplexed signal to radiate into a spatial transmission line. An orthogonal frequency division multiplexed signal receiving apparatus receives the signal from the transmitting apparatus to get the reference signal by demodulating the signal.

11 Claims, 10 Drawing Sheets

FIG.1
PRIOR ART

| FUNCTION | VALUE |
|---|---|
| SUB-CARRIER MODULATION SYSTEM | BPSK, QPSK, 16QAM, 64QAM |
| IFFT ORDER | 64 |
| GUARD INTERVAL | 8 SAMPLES OR 16 SAMPLES |
| SUB-CARRIER NUMBER | 53 |
| DATA CARRIER NUMBER | 48 |
| REFERENCE CARRIER NUMBER | 4 |
| ZERO (CENTER) CARRIER | 1 |

ORTHOGONAL FREQUENCY DIVISION MULTIPLEXED SIGNAL TRANSMITTING APPARATUS, ORTHOGONAL FREQUENCY DIVISION MULTIPLEXED SIGNAL RECEIVING APPARATUS, AND ORTHOGONAL FREQUENCY DIVISION MULTIPLEXED SIGNAL TRANSMITTING/RECEIVING SYSTEM

BACKGROUND OF THE INVENTION

1. Field of the Invention

The present invention relates to an orthogonal frequency division multiplexed signal transmitting apparatus, an orthogonal frequency division multiplexed signal receiving apparatus and an orthogonal frequency division multiplexed signal transmitting/receiving system, which employ an orthogonal frequency division multiplexing system and also employ the transmitted data having the packet structure to execute the data transmission like a burst and, more particularly, an insertion of a reference signal used to compensate amplitude and phase characteristics of the spatial transmission line.

2. Description of the Related Art

In recent years, the remarkable development of the multimedia network with the Internet taking the key media is attained and information revolutions containing IT (Information Technology) as the central revolution are in progress in all the countries of the world.

At present, the multimedia network is advanced mainly by using the computers that are coupled via the cable. In order to achieve the user's convenience, the coupling of the networks via the radio is important. Thus, the products a part of terminals of which is connected by utilizing the radio have been developed, and are available on the market.

Then, initially the character data are main as the information that are dealt with by the multimedia network, and shortly the image data, the video data, the sound data are also transmitted. As for the video data, the request to transmit the video data having high resolution like the normal TV image is increased.

In such circumstances, the realization of the radio network system that has the transmission rate of 20 Mbit/second or more is studied.

In this system, the OFDM (Orthogonal Frequency Division Multiplexing) system is employed in the sub-millwave band of 5 GHz, for example, and the packet type suitable for the radio LAN (Local Area Network), i.e., the burst communication system is employed to transmit the information.

As the burst communication system, for example, there are IEEE 802.11a (Institute of Electrical and Electronics Engineers 802.11 activities) that is standardized recently, HYPER LAN 2 of ETIS (European Telecommunications Standards Institute), MMAC (Multimedia Mobile Access Communication; wideband mobile access) system that is discussed in the interior, etc. The studies of all systems are put forward to realize the communication system that is suitable for the radio transmission of all multimedia.

This OFDM system is the digital modulation system that is employed in the digital terrestrial broadcastings in Japan and Europe, and is known to have the strong transmitting characteristic with respect to the multipath. In addition, it is possible to transmit the information signal having the higher transmission rate by executing the sufficient estimation of the transmission line to compensate the characteristic of the spatial transmission line.

Such estimation of the transmission line is carried out, for example, by providing the preamble data period to the head of the data formulated in the packet structure that is transmitted at a burst, then defining a part of the preamble data, which are transmitted together with a plurality of packets, as the symbol assigned to the reference signal, and then executing the compensation of the transmission line characteristic on the receiver side based on the reference signal transmitted in this manner (referred to as the "reference symbol" hereinafter).

Then, as the second method of executing the compensation of the transmission line characteristic, there is the method of defining the particular sub-carrier of a plurality of sub-carriers, which transmit the data formulated in the packet structure, as the pilot carrier transmitting carrier, then transmitting the data of the packet structure, then examining the characteristic of the transmitted and received pilot carrier on the receiver side, and then compensating of the transmission line characteristic based on the resultant examined characteristic.

In addition, as the third method of executing the estimation of the transmission line characteristic, the method of transmitting the reference symbol every predetermined period if the period in which the data are transmitted is long, etc. may be employed.

FIG. 1 shows major parameters of OFDM data symbols for the multimedia mobile access, in which the data packeted by the OFDM system whose discussion is in progress in IEEE 802.11a, HYPER LAN 2, MMAC, etc., are transmitted like a burst.

In the main parameter specifications of these OFDM data symbols, the OFDM signal is generated by using IFFT (Inverse Fast Fourier Transform) whose order is 64.

The transmitted information signal that is formulated as the packet structure is supplied to IFFT as the burst signal, the header signal called the preamble being attached to the head of the burst signal, and the reference signal called the reference symbol and used to decode the data being inserted into a part of the preamble signal.

IFFT generates 53 sub-carriers consequently. Then, 48 sub-carriers of 53 sub-carriers are assigned as the data carrier, and then these data carriers are digital-modulated by BPSK (Bi-Phase Shift Keying), QPSK (Quadrature Phase Shift Keying), 16 QAM (16-Quadrature Amplitude Modulation) or 64 QAM based on the information signal to be transmitted.

In the above respective standards, it is decided that the reference signal is inserted in the preamble period and also transmitted in the data period subsequent to the preamble period. That is, particular four sub-carriers of 53 sub-carriers are defined as the pilot carrier (reference carrier), and the decoding reference signal is transmitted by using the pilot carrier. In this case, as shown in FIG. 1, the remaining one sub-carrier is the zero (center) carrier.

FIG. 2 shows a configuration of a sub-carrier transmitted from the transmitting apparatus.

As described above, 4 sub-carriers of 53 sub-carriers are used as the pilot carrier, in other words the decoding reference signal is always transmitted, and the data carrier is decoded based on the transmitting characteristic, which is transmitted by the decoding reference signal, on the receiver side.

By the way, IFFT outputs 53 sub-carriers as 64 time-series sampling point signal. At this time, in order to reduce the multipath distortion in the transmission line, the last 8 or 16 sample signal of the 64 sample signal is inserted prior to the 64 sample signal as the guard interval signal.

FIG. 3 shows the relationship between the signal generated by IFFT and the guard interval.

Meanwhile, in the transmission of the decoding reference signal by using the reference symbol and the pilot carrier in the apparatus in the prior art, if respective data carriers have the transmission characteristic with the frequency selectivity due to the multipath characteristic of the spatial transmission line, or if the transmitting amplitude characteristic with the frequency selectivity is varied with the time, or if the transmitted burst data length is long, it is difficult to execute the sufficient estimation of the transmission line by using these reference symbols and four pilot carriers. Thus, the false data are caused frequently depending on the characteristics of the transmission line.

Then, in HiSWAN (High Speed Wireless Access) as one standard specification in the MMAC promoting conference, it is defined that, in the downward communication executed from the master apparatus to the terminal apparatus, the reference symbol signal in addition to the above pilot carrier is applied periodically. Thus, since the transmission line compensation for all carriers can be carried out with respect to the data signals having the long burst period every predetermined interval by employing the inserted reference symbol signal, the good transmission characteristic can be obtained.

However, if all sub-carriers which are transmitted in the particular symbol period are used as the reference signal, the reduction in the symbol period used in the data transmission is caused, which brings about the reduction in the data transmission efficiency with the reduction of the symbol period.

In summary, in the transmission of the reference signal in the prior art, the data transmission with the predetermined performance can be carried out in the good spatial transmission line that is not subjected to the influence of the multipath distortion, however the data error rate is increased under the circumstances in which the multipath distortion characteristic of the spatial transmission line is bad, so that it is impossible to assure the sufficient communication path.

In such manner, there is the method of inserting the reference symbols periodically to execute the sufficient compensation of the transmission characteristic even in the spatial transmission line that has the large multipath distortion. In this case, the data error rate can be improved, but there is the drawback that reduction in the data transfer rate is brought about.

SUMMARY OF THE INVENTION

It is an object of the present invention to provide an orthogonal frequency division multiplexed signal transmitting apparatus, an orthogonal frequency division multiplexed signal receiving apparatus and an orthogonal frequency division multiplexed signal transmitting/receiving system, which are capable of securing the communication line that can execute the data transmission having less degradation of the data error rate under the circumstances, that have the bad multipath distortion, and also can execute the data transmission at as high the transmission rate as possible in the good spatial transmission line, that has the small multipath distortion, without the larger reduction in the transmission efficiency.

In order to achieve the above object, there is provided an orthogonal frequency division multiplexed signal transmitting apparatus for dividing a supplied information signal into a plurality of signals, then providing a plurality of carrier signals, each carrier signal being generated as a digital-modulated carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting a resultant signal into a spatial transmission line, the transmitting apparatus comprising: a reference position information signal generating means for generating a reference position information signal to decide a position of the reference carrier signal to be time-division multiplexed based on an interval setting input signal being supplied; a packet signal generating means for receiving the reference position information signal and the information signal and then generating a packet signal by time-division multiplexing the received signals; an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

According to the present invention, the position of the reference carrier signal to be time-division multiplexed is decided based on the interval setting input signal that can be set previously, then the time-division multiplexed packet signal is generated from the decided reference position information signal and the information signal to be transmitted, and then the orthogonal frequency division multiplexed signal is generated by digital-modulating a plurality of carrier signals by the generated packet signal to transmit into the spatial transmission line. Therefore, since the optimum interval of the reference signals can be set in response to the transmission line quality due to the multipath distortion, etc. in the spatial transmission line, there can be achieved the effect such that the orthogonal frequency division multiplexed signal transmitting apparatus that is able to assure the data transmission line whose data error rate is improved can be constructed without the excessive reduction of the transmission bit rate.

In the preferred embodiment of the present invention, the interval setting input signal in the reference position information signal generating means is a signal that is obtained by receiving a signal being transmitted from an orthogonal frequency division multiplexed signal receiving apparatus that decides a transmitting interval of the reference carrier signals to transmit.

According to this embodiment, even if a plurality of orthogonal frequency division multiplexed signal transmitting apparatuses exist on the spatial transmission line, these transmitting apparatuses can execute the transmission at the transmitting interval of the common reference signals that are transmitted by the orthogonal frequency division multiplexed signal transmitting/receiving apparatus. Therefore, in particular, there can be achieved the effect such that the orthogonal frequency division multiplexed signal transmitting apparatus that is able to assure the data transmission line whose data error rate is improved can be constructed by the plurality of orthogonal frequency division multiplexed signal transmitting apparatuses.

Also, in order to achieve the above object, there is provided an orthogonal frequency division multiplexed signal transmitting/receiving system comprising: an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of a plurality of signal points decided on the two-dimensional plane, as reference signal points, and then generating the carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signal transmitted from the orthogonal frequency division multiplexed signal transmitting apparatus via the spatial transmission line, then demodulating the received reference carrier signals, then demodulating a plurality of carrier signals based on information of the reference signal points obtained by the demodulation, and then obtaining the transmitted information signal by decoding based on signal point position information obtained by the demodulation, and setting a transmitting interval of desired reference carrier signals that are digital-modulated at a predetermined time interval based on the reference signal point positions in the orthogonal frequency division multiplexed signal transmitting apparatus, and then transmitting set transmitting interval information of the reference carrier signals to the orthogonal frequency division multiplexed signal transmitting apparatus; wherein the orthogonal frequency division multiplexed signal transmitting apparatus includes, a reference position information signal generating means for generating a reference position information signal to decide a position of the reference carrier signal to be time-division multiplexed based on the transmitted interval information of the reference carrier signal being transmitted from the orthogonal frequency division multiplexed signal receiving apparatus; a packet signal generating means for receiving the reference position information signal and the information signal and then generating a packet signal by time-division multiplexing the received signals; an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

According to the present invention, the reference carrier signals transmitted from the transmitting apparatus are demodulated, then the desired time interval of the reference signals is set based on the signal point position information of the reference carrier obtained by the demodulation, then the transmitting interval information of the reference carrier signals is transmitted to the transmitting apparatus, then the time-division multiplexed position of the reference carrier signals is decided by the transmitting apparatus based on the interval setting information signal that is transmitted, then the time-division multiplexed packet signal is generated from the decided reference position information signal and the information signal to be transmitted, and then the orthogonal frequency division multiplexed signal is generated by digital-modulating the plurality of carrier signals by the generated packet signal to transmit into the spatial transmission line. Therefore, since the optimum interval of the reference signal can be set in accordance with the transmission line quality due to the multipath distortion, etc. in the spatial transmission line, there can be achieved the effect such that the orthogonal frequency division multiplexed signal transmitting apparatus that is able to assure the data transmission line whose data error rate is improved can be constructed without the excessive reduction of the transmission bit rate.

Also, in order to achieve the above object, there is provided an orthogonal frequency division multiplexed signal transmitting/receiving system comprising: an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulation quality of the signal points of the reference signal points, which are obtained by the demodulation, or the signal points of the digital-modulated and orthogonal frequency division multiplexed carrier signals, which are obtained by the demodulation, to the orthogonal frequency division multiplexed signal transmitting apparatus; wherein the orthogonal frequency division multiplexed signal transmitting apparatus includes, a reference position information signal generating means for deciding a transmitting interval of the reference carrier signals based on information about the demodulation quality being transmitted from the orthogonal frequency division multiplexed signal receiving apparatus, and then generating a reference position information signal based on the decided transmitting interval of the reference carrier signal; a packet signal generating means for receiving the reference position information signal and the information signal and then generating a packet signal by time-division multiplexing the received signals; an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

According to the present invention, the receiving apparatus demodulates the reference carrier signals transmitted from the transmitting apparatus, and then transmits the quality information of the reference carrier obtained by the demodulation to the transmitting apparatus. The transmitting apparatus decides the desired time interval and the insertion position of the reference signals based on the quality information transmitted from the receiving apparatus, then generates the time-division multiplexed packet signal from the decided reference position information signal and the information signal to be transmitted, and then generates the orthogonal frequency division multiplexed signal by digital-modulating the plurality of carrier signals by the generated packet signal to transmit into the spatial transmission line. Therefore, since the optimum interval of the reference signals can be set in accordance with the transmission line quality due to the multipath distortion, etc. in the spatial transmission line, there can be achieved the effect such that the orthogonal frequency division multiplexed signal transmitting apparatus that is able to assure the data transmission line whose data error rate is improved can be constructed without the excessive reduction of the transmission bit rate.

In the preferred embodiment of the present invention, the reference position information signal generating means analyzes a level difference of reference signals, which are transmitted from the orthogonal frequency division multiplexed signal receiving apparatus every transmitting interval as information concerning the demodulation quality, as positions of signal points on the two-dimensional plane, and then changes the transmitting interval of the reference carrier signals when a level difference signal obtained by analysis exceeds a predetermined range.

According to this embodiment, the receiving apparatus demodulates the reference carrier signals transmitted from the transmitting apparatus, and then transmits the level difference of the reference signals obtained every the predetermined time interval by the demodulation to the transmitting apparatus. The transmitting apparatus analyzes the transmitted level difference as position information of the signal points on the two-dimensional plane that is represented by the in-phase axis and the quadrature axis, and then changes the predetermined time interval when the level difference signal exceeds the predetermined range. The transmitting apparatus decides the desired time interval and the insertion position of the reference signal based on the quality information transmitted from the receiving apparatus, then generates the time-division multiplexed packet signal from the decided reference position information signal and the information signal to be transmitted, and then generates the orthogonal frequency division multiplexed signal by digital-modulating a plurality of carrier signals by the generated packet signal to transmit into the spatial transmission line. Therefore, even if the signal from one transmitting apparatus is received by a plurality of receiving apparatuses, the transmitting apparatus analyzes the position information of the signal points transmitted from all receiving apparatuses, and then the optimum interval of the reference signal can be set with respect to the receiving apparatus having the worse receiving state in accordance with the transmission line quality due to the multipath distortion, etc. in the spatial transmission line. As a result, there can be achieved the effect such that the orthogonal frequency division multiplexed signal transmitting apparatus that is able to assure the data transmission line whose data error rate is improved can be constructed without the excessive reduction of the transmission bit rate.

Also, in order to achieve the above object, there is provided an orthogonal frequency division multiplexed signal transmitting/receiving system comprising: an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulated quality of signal point of the reference signal points, which are obtained by the demodulation, or signal points of the carrier signals, which are digital-modulated and orthogonal frequency division multiplexed and then obtained by the demodulation; and an orthogonal frequency division multiplexed signal transmitting/receiving apparatus for deciding a transmitting interval of the reference carrier signals based on the information concerning the demodulation quality transmitted from the orthogonal frequency division multiplexed signal receiving apparatus, and then transmitting the decided transmitting interval information of the reference carrier signals; wherein the orthogonal frequency division multiplexed signal transmitting apparatus includes, a reference position information signal generating means for generating a reference position information signal based on the transmitting interval information of the reference carrier signals being transmitted from the orthogonal frequency division multiplexed signal transmitting/receiving apparatus; a packet signal generating means for receiving the reference position information signal and the information signal and then generating a packet signal by time-division multiplexing the received signals; an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

According to the present invention, the receiving apparatus demodulates the reference carrier signals transmitted from the transmitting apparatus, and then transmits the quality information of the reference carrier obtained by the demodulation to the master apparatus. The master apparatus decides the desired time interval and the insertion position of the reference signal based on the quality information transmitted from the receiving apparatus to transmit to the transmitting apparatus. The transmitting apparatus generates the time-division multiplexed packet signal from the decided reference position information signal and the information signal to be transmitted, and then generates the orthogonal frequency division multiplexed signal by digital-modulating a plurality of carrier signals by the generated packet signal to transmit into the spatial transmission line. Therefore, since the optimum interval of the reference signal can be set in accordance with the transmission line quality due to the multipath distortion, etc. in the spatial transmission line, there can be achieved the effect such that the orthogonal frequency division multiplexed signal transmitting apparatus that is able to assure the data transmission line whose data error rate is improved can be constructed without the excessive reduction of the transmission bit rate.

Also, in order to achieve the above object, there is provided an orthogonal frequency division multiplexed signal transmitting/receiving system comprising: an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning the predetermined time interval, at which the reference carrier signals are to be transmitted, based on a demodulation quality of the reference signal points obtained by the demodulation to the orthogonal frequency division multiplexed signal transmitting apparatus; wherein the orthogonal frequency division multiplexed signal receiving apparatus includes, a reference signal demodulating means for demodulating the received reference carrier signals to get the reference signal, and a reference signal analyzing means for analyzing the reference signal obtained by the reference signal demodulating means as positions of signal points on the two-dimensional plane, then deciding a predetermined time interval, at which the reference carrier signals is to be transmitted, based on a signal obtained by the analysis, and then supplying information based on the decided time interval.

According to the present invention, the receiving apparatus demodulates the reference carrier signals transmitted from the transmitting apparatus, then decides the desired time interval and the insertion position of the reference signal based on the quality information of the reference carrier obtained by the demodulation, and then transmits the decided information to the transmitting apparatus. The transmitting apparatus generates the time-division multiplexed packet signal from the reference position information signal based on the time interval and the insertion position information of the reference carrier signals transmitted from the receiving apparatus and the information signal to be transmitted, and then generates the orthogonal frequency division multiplexed signal by digital-modulating a plurality of carrier signals by the generated packet signal to transmit into the spatial transmission line. Therefore, since the optimum interval of the reference signal can be set in accordance with the transmission line quality due to the multipath distortion, etc. in the spatial transmission line, there can be achieved the effect such that the orthogonal frequency division multiplexed signal receiving apparatus that is able to assure the data transmission line whose data error rate is improved can be constructed without the excessive reduction of the transmission bit rate.

Also, in order to achieve the above object, there is provided an orthogonal frequency division multiplexed signal transmitting/receiving system comprising: an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulation quality of the signal points of the reference signal points, which are obtained by the demodulation, or the signal points of the digital-modulated and orthogonal frequency division multiplexed carrier signals, which are obtained by the demodulation, to the orthogonal frequency division multiplexed signal transmitting apparatus; wherein the orthogonal frequency division multiplexed signal receiving apparatus includes, a reference signal demodulating means for demodulating received reference carrier signals to get the reference signal, and a reference signal analyzing means for analyzing the reference signal obtained by the reference signal demodulating means as positions of signal points on the two-dimensional plane, then generating a demodulation quality information signal of the reference signal based on a signal obtained by the analysis, and then supplying the generated demodulation quality information signal.

According to the present invention, the receiving apparatus demodulates the reference carrier signals transmitted from the transmitting apparatus, then analyzes the reference signal obtained at the predetermined time interval by the demodulation as the positions of the signal points on the two-dimensional plane that is constructed by the in-phase axis and the quadrature axis to get the reference signal information by the analysis, and then transmits the resultant reference signal information to the transmitting apparatus. The transmitting apparatus decides the desired time interval and the insertion position of the reference signal, then generates the time-division multiplexed packet signal from the decided reference position information signal and the information signal to be transmitted, and then generates the orthogonal frequency division multiplexed signal by digital-modulating a plurality of carrier signals by the generated packet signal to transmit into the spatial transmission line. Therefore, since the optimum interval of the reference signal can be set in accordance with the transmission line quality due to the multipath distortion, etc. in the spatial transmission line, there can be achieved the effect such that the orthogonal frequency division multiplexed signal receiving apparatus that is able to assure the data transmission line whose data error rate is improved can be constructed without the excessive reduction of the transmission bit rate.

Also, in order to achieve the above object, there is provided an orthogonal frequency division multiplexed signal transmitting/receiving system comprising: an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning the predetermined time interval, at which the reference carrier signals are to be transmitted, based on a demodulation quality of the reference signal points obtained by the demodulation to the orthogonal frequency division multiplexed signal transmitting apparatus; wherein the orthogonal frequency division multiplexed signal receiving apparatus includes, a reference signal demodulating means for demodulating received reference carrier signals to get the reference signal, and a reference signal analyzing means for analyzing a level difference of the reference signal, which is demodulated at neighboring time intervals by the reference signal demodulating means, as positions of signal points on the two-dimensional plane, then generating information signal to change the predetermined time interval when a resultant analyzed level difference signal exceeds a predetermined range, and then supplying the generated information signal.

According to the present invention, the receiving apparatus demodulates the reference carrier signals transmitted from the transmitting apparatus, then analyzes the level difference of the reference signal obtained at the predetermined time interval by the demodulation as the positions of the signal points on the two-dimensional plane that is constructed by the in-phase axis and the quadrature axis to get the reference signal information by the analysis, and then transmits the information to change the predetermined time interval when the level difference signal exceeds the predetermined range. The transmitting apparatus decides the desired time interval and the insertion position of the reference carrier signal, then generates the time-division multiplexed packet signal from the decided reference position information signal and the information signal to be transmitted, and then generates the orthogonal frequency division multiplexed signal by digital-modulating a plurality of carrier signals by the generated packet signal to transmit into the spatial transmission line. Therefore, since the optimum interval of the reference signal can be set in accordance with the transmission line quality due to the multipath distortion, etc. in the spatial transmission line, there can be achieved the effect such that the orthogonal frequency division multiplexed signal receiving apparatus that is able to assure the data transmission line whose data error rate is improved can be constructed without the excessive reduction of the transmission bit rate.

Also, in order to achieve the above object, there is provided an orthogonal frequency division multiplexed signal transmitting/receiving system comprising: an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulated quality of signal point of the reference signal points, which are obtained by the demodulation, or signal points of the carrier signals, which are digital-modulated and orthogonal frequency division multiplexed and then obtained by the demodulation; and an orthogonal frequency division multiplexed signal transmitting/receiving apparatus for deciding a transmitting interval of the reference carrier signals based on the information concerning the demodulation quality transmitted from the orthogonal frequency division multiplexed signal receiving apparatus, and then transmitting the decided transmitting interval information of the reference carrier signals to the orthogonal frequency division multiplexed signal transmitting apparatus; wherein the orthogonal frequency division multiplexed signal transmitting/receiving apparatus includes, a reference signal analyzing means for analyzing demodulation quality information of the signal points supplied from the orthogonal frequency division multiplexed signal receiving apparatus to get an analyzed signal, and a reference signal position information transmitting means for deciding the transmitting interval of the reference carrier signals based on the analyzed signal obtained from the reference signal analyzing means, and then supplying a signal based on the decided transmitting interval information as a signal for transmission.

According to the present invention, the receiving apparatus demodulates the reference carrier signals transmitted from the transmitting apparatus, and then transmits the quality information of the reference carrier obtained by the demodulation to the master apparatus. The master apparatus decides the desired time interval and the insertion position of the reference signal based on the quality information transmitted from the receiving apparatus to transmit to the transmitting apparatus. The transmitting apparatus generates the time-division multiplexed packet signal from the decided reference position information signal and the information signal to be transmitted, and then generates the orthogonal frequency division multiplexed signal by digital-modulating a plurality of carrier signals by the generated packet signal to transmit into the spatial transmission line. Therefore, if there are a plurality of transmitting apparatuses that are managed by the master apparatus, the optimum interval of the reference signal can be set with respect to respective transmitting apparatuses in accordance with the transmission line quality due to the multipath distortion, etc. in the spatial transmission line. As a result, there can be achieved the effect such that the orthogonal frequency division multiplexed signal transmitting/receiving apparatus that is able to assure the data transmission line whose data error rate is improved can be constructed without the excessive reduction of the transmission bit rate.

Also, in order to achieve the above object, there is provided an orthogonal frequency division multiplexed signal receiving apparatus for receiving a signal transmitted from an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a time interval transmitted from an orthogonal frequency division multiplexed signal transmitting/receiving apparatus, as reference carrier signals, and receiving the generated carrier signals and the generated reference carrier signals as a time-division multiplexed signal, and then transmitting the time-division multiplexed signal into a spatial transmission line; the receiving apparatus comprising: a carrier signal demodulating means for obtaining the plurality of carrier signals and the reference carrier signals via the spatial transmission line to get demodulated output signals of respective carrier signals; a reference signal level acquiring means for obtaining transmitting interval information of the reference carrier signal transmitted from the orthogonal frequency division multiplexed signal transmitting/receiving apparatus from the demodulated output signals obtained from the carrier signal demodulating means and then acquiring a demodulated signal level of the reference carrier signals contained in the demodulated output signals on the two-dimensional plane; and a demodulated signal decoding means for decoding the demodulated output signals obtained from the carrier signal demodulating means based on the demodulated signal level obtained by the reference signal level acquiring means.

According to the present invention, the receiving apparatus demodulates the reference carrier signals transmitted from the transmitting apparatus, and then transmits the quality information of the reference carrier obtained by the demodulation to the master apparatus. The master apparatus decides the desired time interval and the insertion position of the reference signal based on the quality information transmitted from the receiving apparatus to transmit to the transmitting apparatus. The transmitting apparatus generates the time-division multiplexed packet signal from the decided reference position information signal and the information signal to be transmitted, and then generates the orthogonal frequency division multiplexed signal by digital-modulating a plurality of carrier signals by the generated packet signal to transmit into the spatial transmission line. Therefore, even if a plurality of transmitting apparatuses and the receiving apparatus share the spatial transmission line to communicate, the optimum interval of the reference signal can be set with respect to the signals transmitted from these transmitting apparatuses in accordance with the transmission line quality due to the multipath distortion, etc. in the spatial transmission line. As a result, there can be achieved the effect such that the orthogonal frequency division multiplexed signal receiving apparatus that is able to assure the data transmission line whose data error rate is improved can be constructed without the excessive reduction of the transmission bit rate.

The nature, principle and utility of the invention will become more apparent from the following detailed description when read in conjunction with the accompanying drawings.

BRIEF DESCRIPTION OF THE DRAWINGS

In the accompanying drawings:

FIG. 1 shows major parameters of OFDM data symbols for the multimedia moving access, in which the packet data are transmitted at a burst, in the prior art;

DESCRIPTION OF THE PREFERRED EMBODIMENTS

Embodiments of an orthogonal frequency division multiplexed signal transmitting apparatus, an orthogonal frequency division multiplexed signal receiving apparatus and an orthogonal frequency division multiplexed signal transmitting/receiving system according to the present invention will be explained with reference to preferred embodiments hereinafter.

Figure 2:
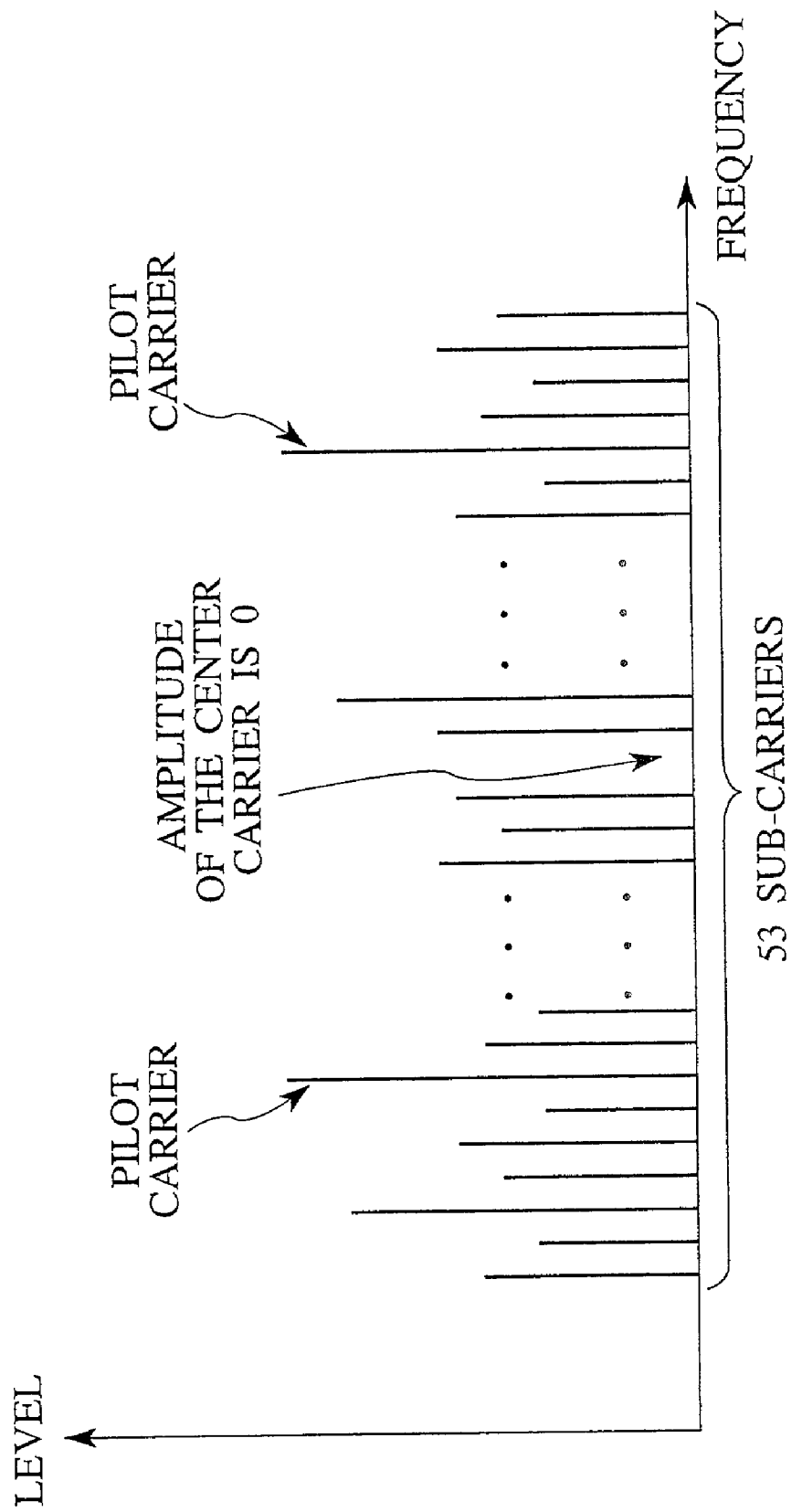
FIG. 2 is a view showing a configuration of sub-carriers transmitted from the OFDM transmitting apparatus for the multimedia moving access in the prior art.
Figure 3:
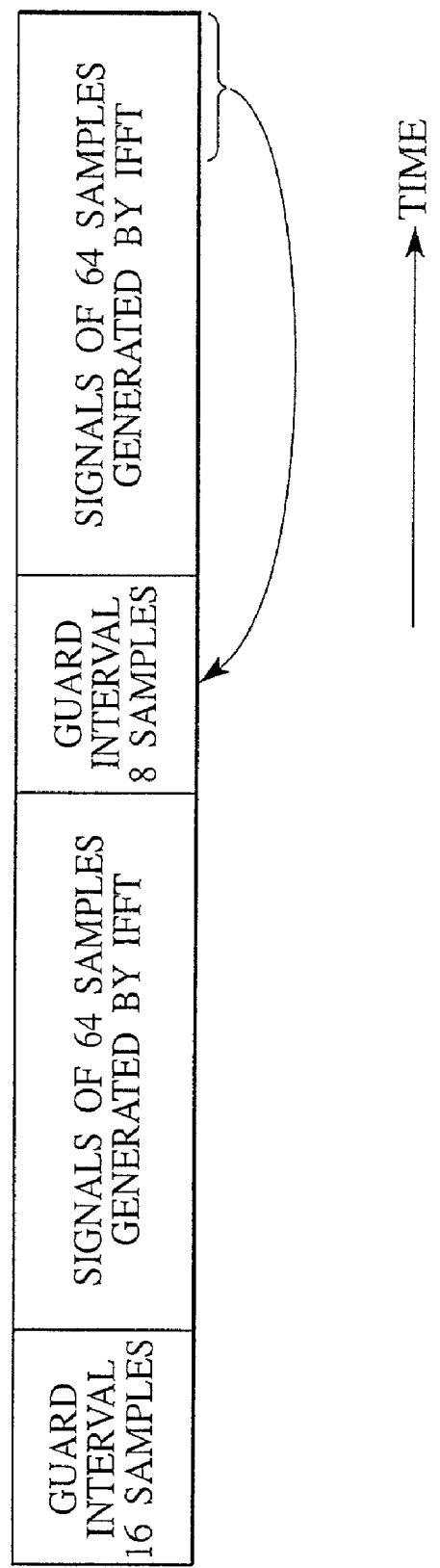
FIG. 3 is a view showing a manner of adding a guard interval signal in the OFDM signal in the prior art.
Figure 4:
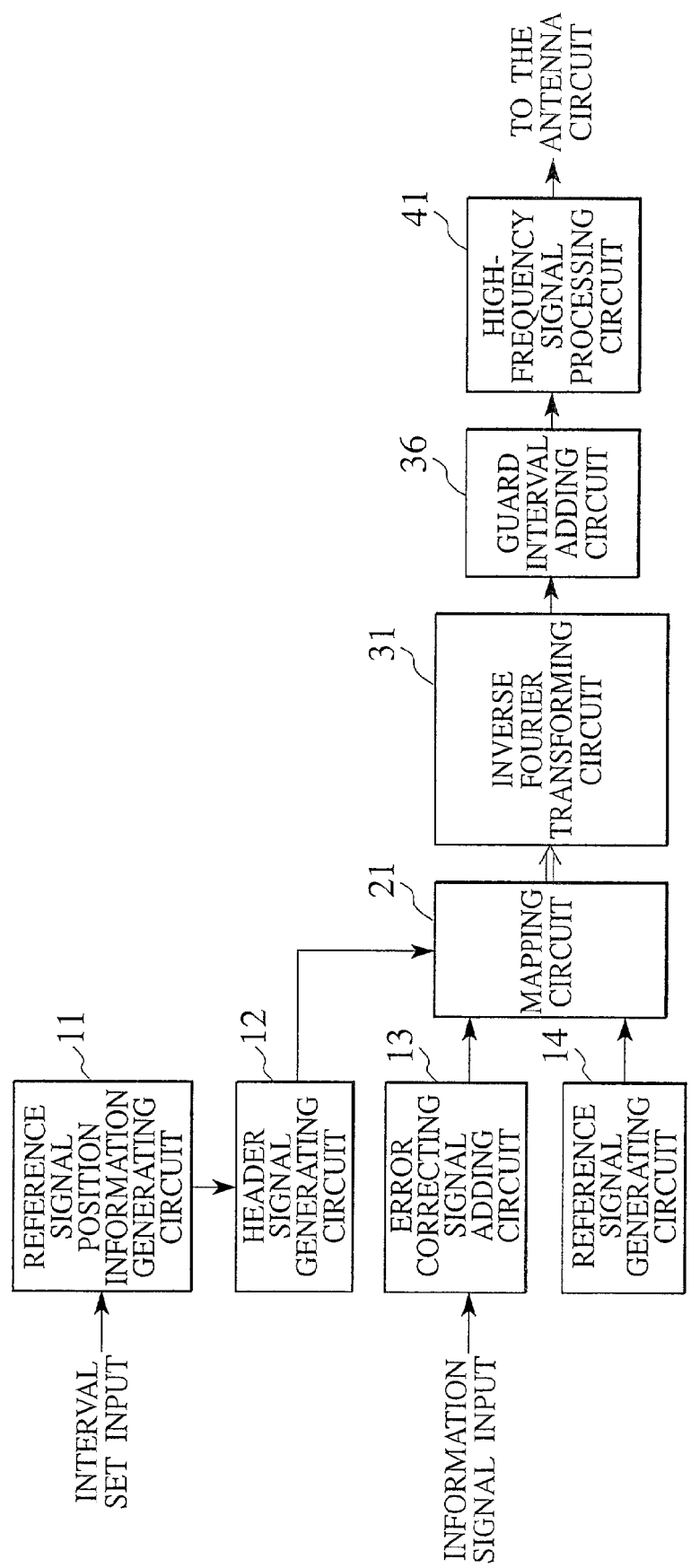
FIG. 4 is a schematic block diagram showing an orthogonal frequency division multiplexed signal transmitting apparatus according to an embodiment of the present invention.

FIG. 4 shows a schematic configuration of an orthogonal frequency division multiplexed signal transmitting apparatus according to an embodiment of the present invention.

This orthogonal frequency division multiplexed signal transmitting apparatus comprises a reference signal position information generating circuit 11, a header signal generating circuit 12, an error correcting signal adding circuit 13, a reference signal generating circuit 14, a mapping circuit 21, an inverse Fourier transforming circuit 31, a guard interval adding circuit 36, and a high-frequency signal processing circuit 41.

In the orthogonal frequency division multiplexed signal transmitting apparatus constructed in this manner, the information signal to be transmitted is supplied, such data information is divided into predetermined data sizes, the header signal is added to the head of the divided data, the header signal and the data signal are modulated by the orthogonal frequency division multiplexing system together with the reference signal that is used to compensate the transmission line characteristic, the guard interval signal is attached to the modulated signal and is subjected to the high frequency process, and the resultant signal is radiated into the spatial transmission line via the antenna.

An operation of the orthogonal frequency division multiplexed signal transmitting apparatus will be explained with reference to above FIG. 4 hereunder.

First, the data of the information signal to be transmitted is supplied to the error correcting signal adding circuit 13, and then the error correcting signal that is used to correct the error signal that will be generated in the spatial transmission line at the receiving terminal is added herein and then is supplied to the mapping circuit 21.

Then, the header signal, which is generated by the header signal generating circuit 12 to contain the position information of the reference signal generated by the reference signal position information generating circuit 11, and the reference signal, which is generated by the reference signal generating circuit 14, are supplied to the mapping circuit 21 in addition to the data signal.

The information signal, the header signal, and the reference signal supplied in this manner are time-division-multiplexed by the mapping circuit 21. Then, the time-division-multiplexed signal is supplied to the 64-order inverse Fourier transforming circuit 31, as a total of 104 parallel signals serving as the real-part signal and the imaginary-part signal that correspond to 52 sub-carriers to be modulated by the orthogonal frequency division multiplexing system.

The inverse Fourier transforming circuit 31 generates the 52 modulated sub-carrier signals that are correlated with respective supplied signals in the form of sample data, the number of the discrete data of which is 64 in the effective symbol period.

Then, 64-sample data generated in this way are supplied to the guard interval adding circuit 36. Here, the data having the same value as the last 8 pieces of the sample data are arranged before the 64-sample data to formulate the signal containing a total of 72 sample data.

Such 8 data are the data of the guard interval and act as the signal to reduce the multipath distortion in the spatial transmission line. The data generated in such manner are supplied to the high-frequency signal processing circuit 41.

In the high-frequency signal processing circuit 41, the sub-carrier signals generated as the real-part signal output and the imaginary-part signal output are converted into the synthesized signal by applying the orthogonal modulation. Then, the resultant modulated signal is converted into the signal having the frequency that is radiated into the spatial transmission line. Then, the high frequency signal that is frequency-modulated is power-amplified and then supplied to the antenna circuit (not shown).

Figure 5:
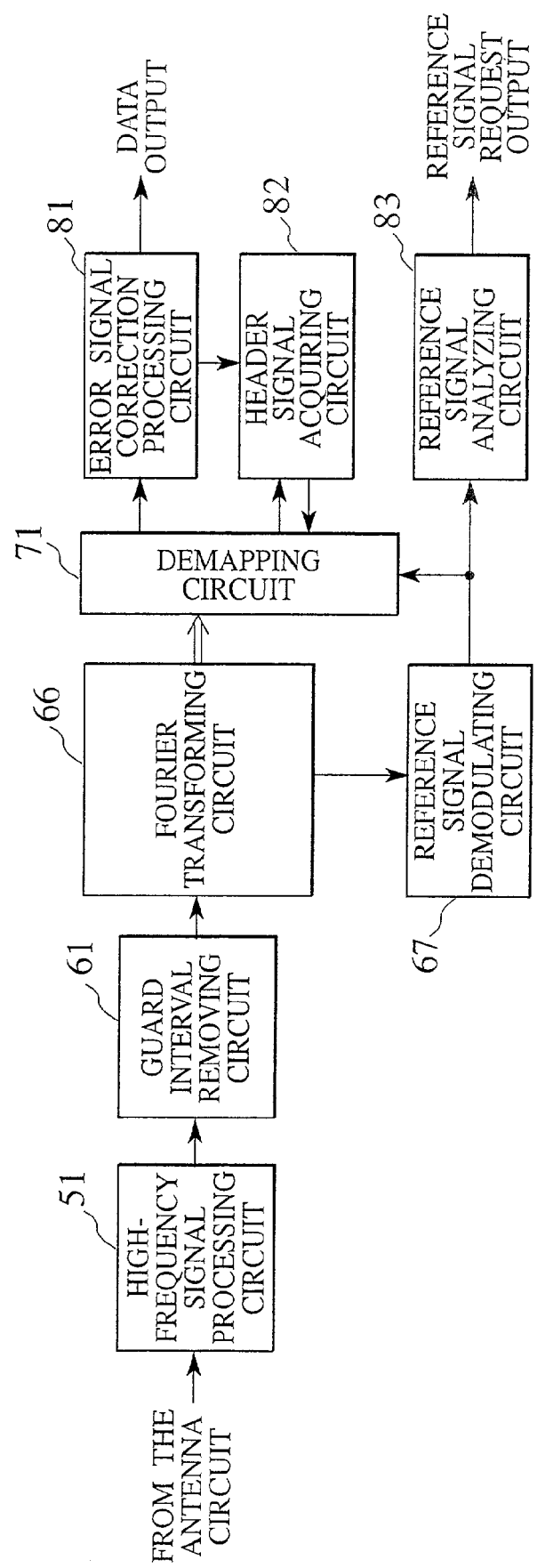
FIG. 5 is a schematic block diagram showing an orthogonal frequency division multiplexed signal receiving apparatus according to the embodiment of the present invention.

FIG. 5 shows a configuration of an orthogonal frequency division multiplexed signal receiving apparatus according to the embodiment of the present invention. This orthogonal frequency division multiplexed signal receiving apparatus will be explained hereunder.

This orthogonal frequency division multiplexed signal receiving apparatus comprises a high-frequency signal processing circuit 51, a guard interval removing circuit 61, a Fourier transforming circuit 66, a reference signal demodulating circuit 67, a demapping circuit 71, an error signal correction processing circuit 81, a header signal acquiring circuit 82, and a reference signal analyzing circuit 83.

This orthogonal frequency division multiplexed signal receiving apparatus receives the signal, which is radiated into the space from the orthogonal frequency division multiplexed signal transmitting apparatus, from the antenna circuit (not shown), and then demodulates respective sub-carrier signals by Fourier-transforming the orthogonal frequency division multiplexed signal consisting of 52 resultant sub-carriers.

Also, in the orthogonal frequency division multiplexed signal receiving apparatus, the digital signal is decoded by the demapping circuit based on the demodulated signal that is obtained by demodulating the sub-carrier signals, then the reference signal is generated based on the resultant decoded header signal, then the information signal is decoded based on the resultant reference signal, and then the decoded information signal is subjected to the error correcting process to output.

An operation of the orthogonal frequency division multiplexed signal receiving apparatus constructed in this fashion will be explained in detail every circuit block constituting the apparatus.

First, the signal that is radiated into the space from the orthogonal frequency division multiplexed signal transmitting apparatus is received via the antenna circuit (not shown), then the received signal is frequency-amplified by the high-frequency signal processing circuit 51, then the amplified signal is converted into the intermediate frequency that is easy to process the signal, and then the signal that is converted into the intermediate frequency is orthogonally demodulated and then supplied to the guard interval removing circuit 61 as the real-part signal and the imaginary-part signal for the 52 sub-carriers.

In the guard interval removing circuit 61, the portion of the guard interval signal that is added by the transmitting apparatus, i.e, 8-sample signals are removed to get 64-sample signals, and then the resultant signal is supplied to the Fourier transforming circuit 66.

The Fourier transforming circuit 66 applies the Fourier transform to the supplied signal of 64 samples to get the Fourier analysis results of the real part and the imaginary part with respect to respective 52 sub-carriers.

Here, the sub-carriers of 52 sub-carriers in the predetermined frequency are used to transmit the reference signal. The signal levels of the real part and the imaginary part of the 52 sub-carriers in the frequency are the reference levels to decode the digital signal.

The header signal is decoded on the basis of the reference level obtained in this way. Then, transmitting information at other levels are obtained based on the decoded header signal and also the data signal is decoded based on these reference level signals.

Here, the signal that is QPSK-modulated at the position of the signal point, the value of which on the real axis is 1 or −1, is employed as the reference level. In this case, the signal that is BPSK-modulated at other position of the signal point, at which the modulation is easily executed, may be employed if such signal is decided previously on the transmitting apparatus side.

Then, the decoded data signal is supplied to the error signal correction processing circuit 81. Then, the false data that are caused by the reduction in the transmission quality of the spatial transmission line, etc. is corrected into the right value and then supplied as the data output.

Here, the reference signal requesting output signal as well as the data output is output from the orthogonal frequency division multiplexed signal receiving apparatus. This reference signal requesting output signal described later is the signal that is used to supply analyzed results of the level variation, etc. of the supplied reference signal to the orthogonal frequency division multiplexed signal transmitting apparatus and to receive the signal that is transmitted by using the optimized reference signal.

As described above, the signal being transmitted from the orthogonal frequency division multiplexed signal transmitting apparatus is received by the orthogonal frequency division multiplexed signal receiving apparatus. Then, orthogonal frequency division multiplexing communication systems that transmit and receive the OFDM signal for the multimedia mobile access, in which the packet data discussed in IEEE 802.11a, Hyper LAN 2, MMAC, etc. are transmitted at a burst, will be explained further more.

These communication systems are applied to a LAN (Local Area Network) constructed by connecting elements therein via a radio to construct a future radio communication infrastructure, a conventional LAN being constructed by connecting elements therein via a wire. The frequency band used in the radio is 5 GHz band.

These radio apparatuses are connected via the network configuration that connects a plurality of terminals via a plurality of loops. The communication between these connected terminals is carried out by not the continuous communication system in which the signal is continuously transmitted, but the burst communication system in which the transmission/reception is switched by a plurality of systems in a short time.

In order to execute the burst communication, the continuous data are divided into the burst data, then a period that is called the preamble is provided to the head of the burst data, and then respective terminals get the symbol synchronizing timing signal transmitted together with the preamble signal and also execute the frequency/phase synchronization of the demodulation circuit drive synchronizing signal during the period in which this preamble signal is transmitted.

In addition, the reference symbol period is provided to a part of the preamble period, then the reference signal called the pilot carrier is transmitted in this reference symbol period, then the transmission characteristic of the data transmission line is estimated by using this reference signal, and then the transmitted data are decoded based on the estimated transmission characteristic.

Normally the reference signal is inserted during the preamble signal period and transmitted. If the data length transmitted subsequently to the preamble, i.e., the burst length becomes long, sometimes the reference signal may be inserted into such long data period every predetermined interval.

The data transmission/reception between such terminals will be explained with reference to Figures hereunder.

Figure 6:
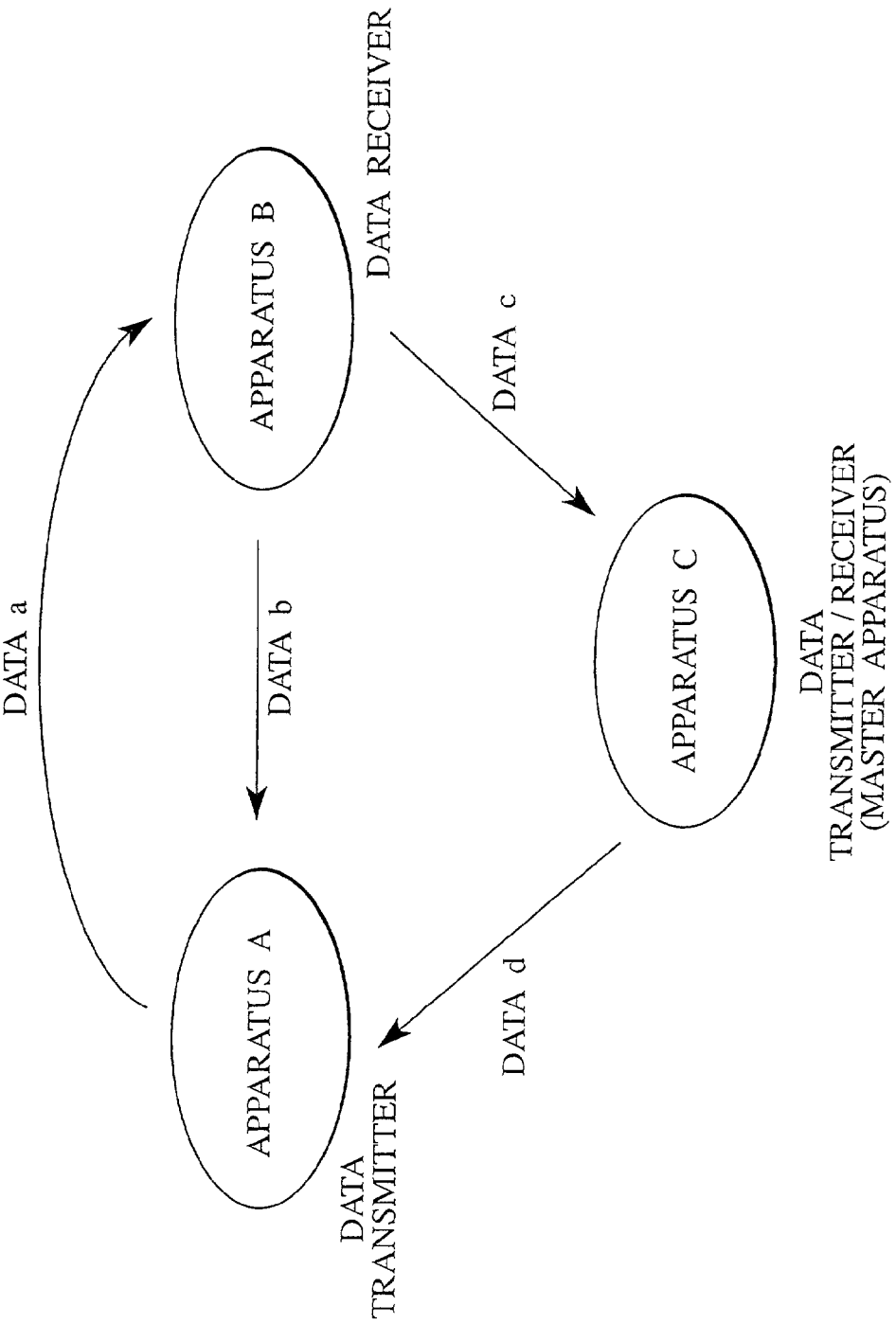
FIG. 6 is a view showing a network connection of a transmitter, a receiver, and a transmitter/receiver according to the embodiment of the present invention.

FIG. 6 shows an example of a configuration in which an apparatus A, an apparatus B, and an apparatus C are connected via the network.

In FIG. 6, the apparatus A is connected as the transmitting terminal for transmitting the data, and the apparatus B is connected as the receiving terminal for receiving the data. Then, the data transmission/reception between these terminals will be carried out in the following manner.

First, the case where the data a as the information data is transmitted from the apparatus A and the apparatus B receives the information data will be explained hereunder.

In other words, the reference signal is inserted intermittently into the data a that is transmitted from the apparatus A. At this time, the insertion of the reference symbol and the transmission interval of the reference symbol may be set adaptively.

Then, when the signal into which the reference symbol is inserted is transmitted, the OFDM-modulated signal is demodulated based on the reference symbol on the receiving side and also the digital signal is obtained by demapping the resultant demodulated signal. Since the signal level at the arrangement of the reference signal point can be obtained at the same time, the demapping operation can be carried out precisely based on the reference level.

As the level varying factors of the reference signal used to execute the demapping operation, there are many factors such as the temperature characteristics of the high frequency circuit and the demodulation circuit, the characteristic variation of various filters provided in the circuit, etc. The most significant varying factor is the disturbance of the amplitude characteristic and the phase characteristic due to the influence of the multipath distortion in the spatial transmission line.

Then, the disturbance of the amplitude characteristic and the phase characteristic by the multipath distortion has the large value when the transmission/reception is carried out under the mobile circumstances, but the variation level of the reference signal is small in the still circumstances.

Accordingly, even if the transmission interval of the reference symbol is reduced in the still transmission/reception circumstances, the BER (Bit Error Rate) characteristic cannot be improved. However, the BER characteristic can be largely improved if the interval of the reference symbol is reduced in the mobile circumstances, while the BER characteristic is largely degraded if the interval of the reference symbol is increased conversely.

In this manner, since the transmission efficiency is lowered if the insertion interval of the reference symbol is reduced, the interval of the reference symbols is enlarged in the still circumstances within the range in which the desired BER characteristic can be ensured whereas the interval of the reference symbols is set small in the mobile circumstances to get the desired BER characteristic.

At this time, the transmission efficiency is lowered by reducing the interval of the reference symbols, nevertheless such an operation that the received signal is seldom decoded in the mobile circumstances can be avoided.

In this fashion, it is an effective approach for executing the communication to get the desired BER characteristic while maintaining the reduction of the transmission efficiency small to vary the reference symbol inserting interval adaptively in response to the circumstances in which the transmission/reception is carried out.

At this time, the reference symbols to be inserted intermittently may be inserted successively over plural symbols. Then, such inserting method will be explained hereunder.

Figure 7:
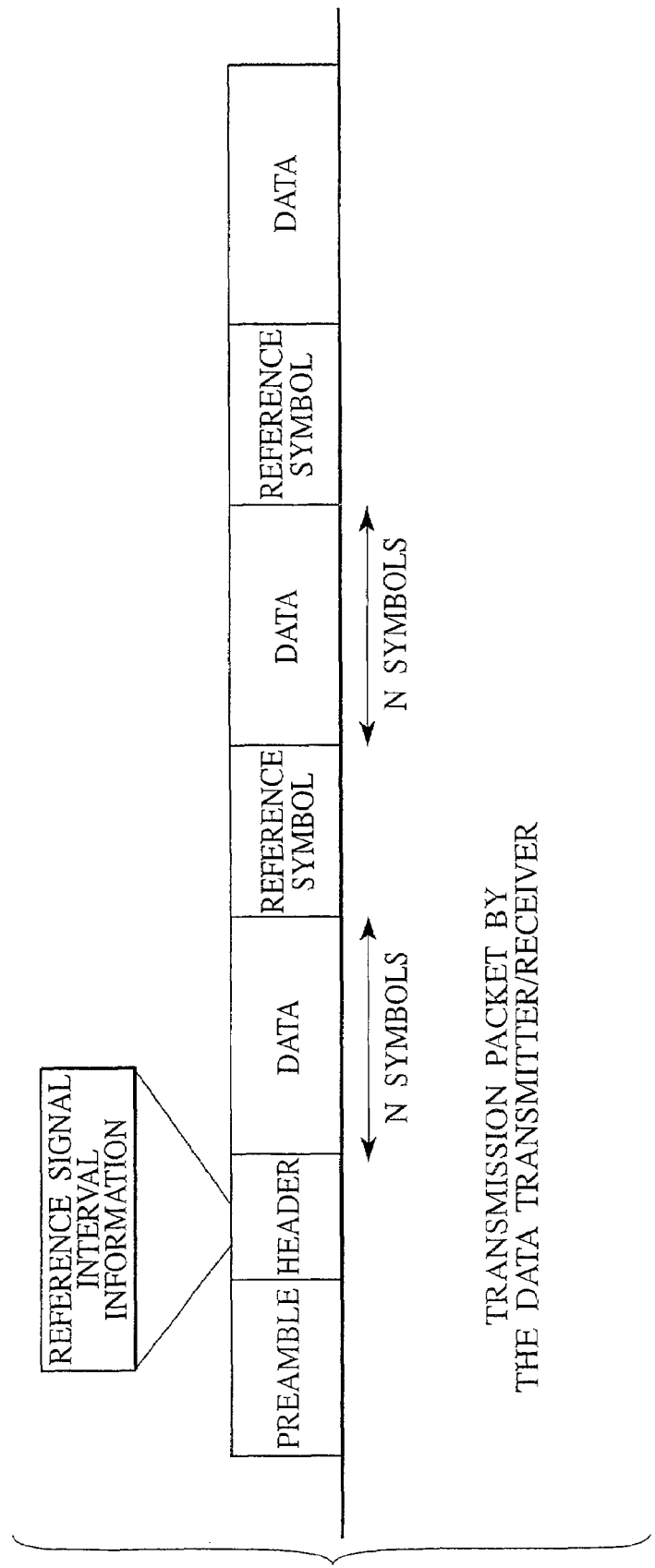
FIG. 7 is a view showing a packet structure of the data that is transmitted from the orthogonal frequency division multiplexed signal transmitting apparatus according to the embodiment of the present invention.

FIG. 7 shows a packet structure of the data that is transmitted from the orthogonal frequency division multiplexed signal transmitting apparatus.

In FIG. 7, the configuration of the packet, which is transmitted in the order of the preamble, the header, the data, the reference symbol, and the data, is shown. The interval information of the reference signal is inserted into the header.

The receiving apparatus for receiving the signal transmitted in this way decodes the reference signal interval information transmitted in the header area, then receives the reference signal based on the decoded reference signal interval information, then obtains the reference level of the signal point arrangement based on the resultant reference signal, and then the decoding operation is carried out by demapping the data that are demodulated by the Fourier transform circuit based on the reference level.

Here, the reference symbol is retransmitted after N (N is the positive integer) symbols of the transmitted data. The information concerning the transmitted interval of such reference symbols is transmitted by the header information shown in FIG. 7, for example. The receiving apparatus receives the information of the reference symbol interval information while receiving the header information that are transmitted in this manner, and then executes the above demodulation and the decoding based on the resultant information.

In addition, the receiving apparatus detects the varied values in the amplitude and the phase between the currently received reference signal and the reference signal received before N symbols by the reference signal analyzing circuit 83. Then, if the detected value is in excess of a certain set threshold value, the receiving apparatus transmits the signal that requests the transmitting apparatus to reduce the reference symbol interval.

Figure 8:
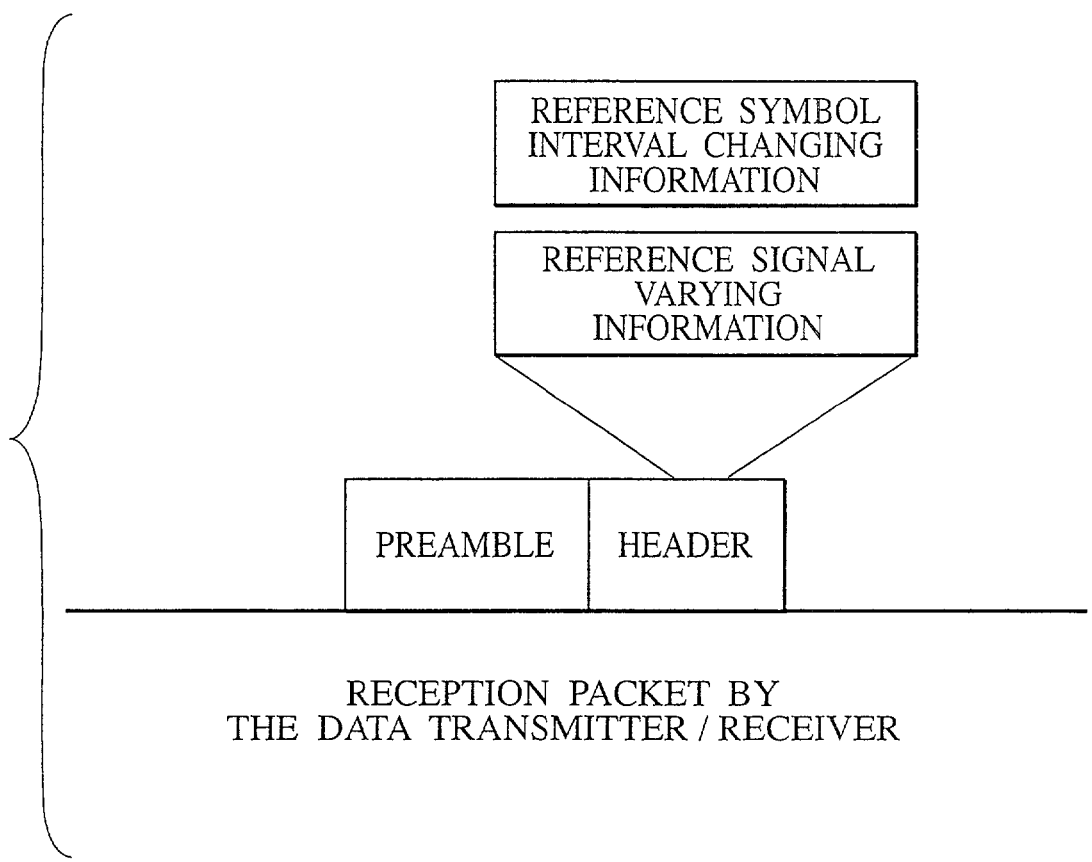
FIG. 8 is a view showing an acknowledge packet structure that is transmitted from the orthogonal frequency division multiplexed signal receiving apparatus according to the embodiment of the present invention.

FIG. 8 is a view showing a configuration of an acknowledge packet that transmits the request signal from the receiving apparatus to the transmitting apparatus.

In FIG. 8, the acknowledge packet consists of the preamble and the header, and the reference signal varying information and the reference symbol interval changing information are contained in the header.

The receiving apparatus issues the reference symbol interval changing request to the transmitting apparatus by transmitting such acknowledge packet to the transmitting apparatus. Then, the transmitting apparatus allocates changed reference symbol interval information to the header of the transmitting packet in response to the request, and executes the data transmission while inserting the reference symbol in accordance with the interval information.

The above operation corresponds to such a method that, as shown in above FIG. 6, the receiving apparatus B transmits the data b, in which the reference signal varying information are allocated to the acknowledge packet, to the transmitting apparatus A and then the transmitting apparatus A sets the reference signal interval based on the reference signal varying information.

Then, such a method may be employed that the transmitting apparatus A sets the reference symbol interval based on the receiving packet fracture rate information, which is returned from the receiving apparatus B, other than the reference signal varying information that is transmitted from the receiving apparatus B.

As mentioned above, the reference symbol interval is set by communicating the acknowledge packet between the transmitting apparatus A and the receiving apparatus B, both correspond mutually. On the other hand, there is the method that the reference symbol interval may be set by other apparatus C.

Although the apparatus C is not directly concerned with the transmission/reception of the information data, such apparatus C is the master system that controls the data communication carried out between the transmitting apparatus A and the receiving apparatus B, for example, or the like.

Here, there is the method that the receiving apparatus B transmits the acknowledge packet into which the reference signal varying information is inserted as the data c, then the master apparatus C decides the reference symbol interval to be transmitted by the transmitting apparatus A based on the reference signal varying information, and then the master apparatus C issues the reference symbol interval information to the transmitting apparatus A as the data d.

In addition, as other method that is executed via the master apparatus C, the receiving apparatus B decides the reference symbol interval and then transmits the decided reference symbol interval to the master apparatus C as the data c in which the reference symbol interval changing information is allocated to the acknowledge packet, and then the master apparatus C requests/transmits the reference symbol interval information to the transmitting apparatus A as the data d.

Figure 9:
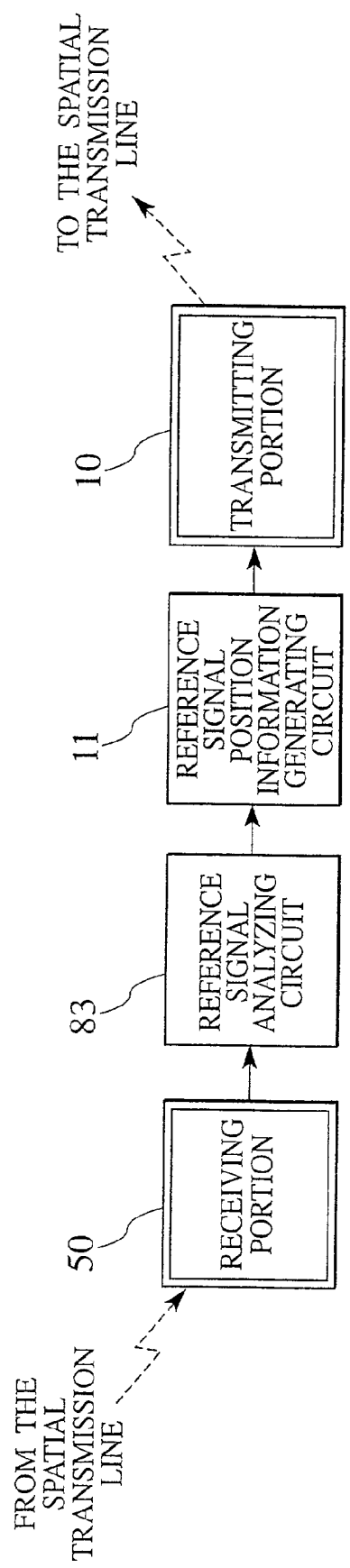
FIG. 9 is a schematic block diagram showing an orthogonal frequency division multiplexed signal transmitting/receiving apparatus according to the embodiment of the present invention.

FIG. 9 shows a configuration of the master apparatus that executes such operations.

This master apparatus comprises a receiving portion 50, a reference signal analyzing circuit 83, a reference signal position information generating circuit 11, and a transmitting portion 10.

In the master apparatus constructed in this way, the receiving portion 50 receives the acknowledge packet signal transmitted from the receiving apparatus B, then the reference signal analyzing circuit 83 gets the information of the reference signal received state from the resultant acknowledge packet signal, then the reference signal position information generating circuit 11 decides the insertion interval and the insertion position of the reference signal based on the resultant information, then transmitting portion 10 receives decided signals of the insertion interval and the insertion position and transmits them, and then the transmitting apparatus A receives the transmitted signals.

According to the method of executing the control of the reference symbol interval via the master apparatus C in this way, since the network is constructed by connecting a plurality of apparatuses in the normal case, the apparatus C is connected so as to make it possible to communicate with all systems on the network if the apparatus C serves as the master apparatus, or the like. Therefore, the reference symbol interval information that is transmitted from the apparatus C is issued such that all the systems connected to the network can acquire simultaneously such information.

The control of the reference symbol interval information made by the master apparatus C is described as above. Of course such a configuration may be employed that the reference symbol interval information transmitted from the apparatus A as the transmitting apparatus can be recognized by other systems on the network, otherwise such a configuration may be employed that the communication systems can set independently the reference symbol interval information mutually.

The reference symbol interval can be set in this manner and thus the effective transmission/reception of the information signal can be achieved. Next, the reference symbol interval setting method will be explained hereunder.

Figure 10:
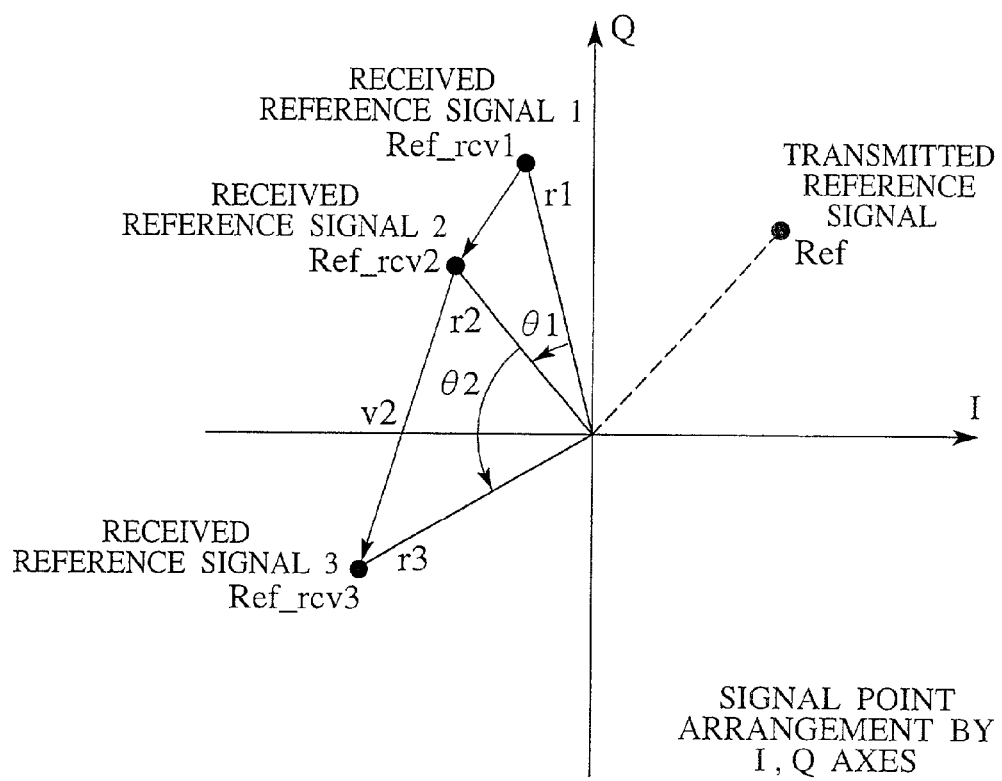
FIG. 10 shows a variation of a reference symbol that is transmitted from the orthogonal frequency division multiplexed signal transmitting apparatus according to the embodiment of the present invention.

FIG. 10 shows a variation of the reference symbol to be transmitted.

In FIG. 10, the I components and the Q components when the Ref position signal being transmitted from the transmitting apparatus and the reference signal being transmitted plural times intermittently at the interval of N symbols are received are shown as Ref#rcv1, Ref#rcv2, Ref#rcv3, wherein an abscissa denotes the in-phase component of the sub-carrier as I (In-phase) and an ordinate denotes the quadrature component as Q (Quadrature).

At this time, in the variations of respective received reference signals, the phase variation from Ref#rcv1 to Ref#rcv2 is $\theta 1$, and the amplitude variation is $r2/r1$ and a vector quantity of the amplitude variation is v1. Then, the next phase variation from Ref#rcv2 to Ref#rcv3 is $\theta 2$, and the next amplitude variation is $r3/r2$ and a vector quantity of the amplitude variation is v2.

The reference symbol interval can be decided by using the information of these phase, amplitude, and vector quantity. In this case, the decision of the reference symbol interval can be made such that respective threshold values of these phase, amplitude, and vector quantity are set, then the reference symbol interval is decided to become small if these values exceed the threshold values, then the reference symbol interval is not changed as it is if these values are smaller than the threshold values, and then the reference symbol interval is decided to increase if these values are very smaller than the threshold values.

In the case of the example shown in FIG. 10, when Ref#rcv2 is received, an amount of variation is small within the threshold value as the analyzed result of the variation from Ref#rcv1. Thus, the reference symbol interval is held as it is. In contrast, when Ref#rcv3 is received, this variation corresponds to an amount of variation that is extremely larger than the threshold value as the analyzed result of the variation from Ref#rcv2. Thus, the receiving apparatus B transmits the acknowledge packet to which the reference symbol interval changing information is allocated to the transmitting apparatus A, and then the transmitting apparatus A reduces the value of data symbol number N and shortens the reference symbol interval.

At this time, a function of deciding whether or not the reference symbol interval should be changed by comparing the variation of the reference level with the predetermined threshold value may be provided in the receiving apparatus. Also, the reference level varying information is transmitted from the receiving apparatus to the transmitting apparatus, and then the reference symbol interval may be decided based on the received reference level varying information in the transmitting apparatus. In addition, the reference symbol interval may be decided by the data transmitting/receiving apparatus as the master apparatus.

The decision of the reference symbol interval executed in this manner may be executed by using the combination of variation information of the amplitude, the phase, the vector quantity of the received reference signal. Otherwise, one of these variation information is picked up, and the reference symbol interval may be decided based on the variation amount of the one value.

Further, there is the method that the reference symbol interval is decided by examining respective shifts of the variation amount of a plurality of reference signals. According to the method of examining the variation amount of a plurality of reference signals, if the variation amount of the frequency selectivity is increased in a part of the transmission band, the reference symbol interval can be changed by detecting such increase. Therefore, the more stable data transmission/reception can be carried out.

In the decision of the reference symbol interval executed by using a plurality of reference signals, since the variation amount of the transmission characteristic per frequency in the frequency transmission band and the time change of the transmission characteristic can be analyzed as two-dimensional data, the linear prediction of the variation amount can be executed. Therefore, the adaptive and optimum decision of the reference symbol interval can be executed more quickly.

The reference symbol interval deciding method is explained as above with the means for realizing such method as the main part. In order to realize the means, in addition to the above method, there are the method of realizing the means by calculating the shift variation amount average of a plurality of reference signals, for example, etc. The appropriate method may be employed as the deciding method, depending on the change in the still or mobile circumstances of the transmitting apparatus or the receiving apparatus, the movement at the limited speed range in the limited multipath condition in the mobile circumstances, the movement in the bad circumstances containing many radio wave reflecting wall, etc.

The method corresponds to the orthogonal frequency division multiplexing signal transmitting method that comprises a first step of generating the reference position information signal based on the supplied interval setting input signal to decide the time-division multiplexed position of the reference carrier signal, a second step of receiving the reference position information signal supplied by the first step and the transmitted information signal and then generating the time-division multiplexed packet signal from these supplied signal, a third step of receiving the packet signal generated by the second step and then generating the orthogonal frequency division multiplexed signal by digital-modulating a plurality of carrier signals, and a fourth step of executing the signal process to radiate the orthogonal frequency division multiplexed signal generated by the third step into the spatial transmission line, for example.

As described above, the data transmission/reception with the small error rate and the good transmission efficiency can be carried out by setting the reference symbol interval adaptively and optimally. This method does not depend on the communication system. For example, this adaptive reference symbol interval setting/deciding method can be employed in both the case where the data transmission is carried out by the asynchronous communication and the case where the data transmission is carried out by the isochronous communication.

Also, the method of changing the reference symbol interval adaptively can be employed singly. But the high-performance communication with the high quality can be carried out by employing this method together with the fall-back control, etc., for example.

In such case, the apparatuses may be constructed to transmit the request for the reference symbol interval change together with the fall-back control information.

Also, as the application of the communication executed in such a way, there is the repeating transmission that employs the asynchronous packet transmission/reception. Such repeating transmission can be achieved by using the transmitting apparatus and the receiving apparatus constructed in this manner.

Assuming that the transmitting apparatus D, the relay apparatus E, and the receiving apparatus F are employed in the repeating transmission. The transmitting apparatus D transmits an information signal, and if the relay apparatus E receives the signal from the transmitting apparatus D and also receives an instruction for causing own apparatus to set as the relay station, the relay apparatus E retransmits the information signal supplied from the transmitting apparatus D as it is.

The signal being transmitted in this way is received by the receiving apparatus F, and then the receiving apparatus F that has received the signal, which is transmitted from the transmitting apparatus D, relayed and retransmitted, transmits the acknowledge packet.

The relay apparatus E receives the acknowledge packet transmitted from the receiving apparatus F, then recognizes the fact that own station is selected as the relay station, and then retransmits the acknowledge packet that is transmitted from the receiving apparatus F and received.

When the acknowledge packet transmitted from the receiving apparatus F in this way is received by the transmitting apparatus D, the repeating transmission is completed.

In the repeating transmission executed in this fashion, when the transmitting apparatus D is moving, for example, the variation in the reference symbol received by the receiving apparatus F is enlarged, but the variation in the reference symbol that is received by the receiving apparatus F in response to the retransmission by the relay apparatus E has the small value.

In this fashion, as the communication method applied when there is difference in the variation of the reference symbol based on the difference in the quality of the spatial transmission line between from the transmitting apparatus D to the relay apparatus E connected thereto via the radio and from the relay apparatus E to the receiving apparatus F connected thereto via the radio, two following methods can be considered.

The first method is the method that the reference symbol intervals between the transmitting apparatus D and the relay apparatus E and between the relay apparatus E and the receiving apparatus F are accommodated to the worse characteristic of the spatial transmission line to shorten the reference symbol intervals both between the apparatus D and the apparatus E and between the apparatus E and the apparatus F.

The second method is the method that the reference symbol intervals between the transmitting apparatus D and the relay apparatus E and between the relay apparatus E and the receiving apparatus F are decided adaptively to the individual value.

The first method can be realized simply. On the other hand, the utilization efficiency of the transmission line can be enhanced, e.g., the transmission rate of the information can be increased, etc., according to the second method.

As the method of realizing the second method, if the above information of the reference signal quality is inserted into the acknowledge packet to transmit, the transmission quality of a plurality of transmission lines used to relay can be identified. Therefore, it is possible to realize the repeating transmission by the second method.

Here, if the repeating transmission transmits the information to a remote receiving apparatus via a plurality of relay apparatuses, etc., respective desired reference signal intervals can be set to plural transmission lines by using a plurality of acknowledge packets.

It should be understood that many modifications and adaptations of the invention will become apparent to those skilled in the art and it is intended to encompass such obvious modifications and changes in the scope of the claims appended hereto.

What is claimed is:

1. An orthogonal frequency division multiplexed signal transmitting apparatus for dividing a supplied information signal into a plurality of signals, then providing a plurality of carrier signals, each carrier signal being generated as a digital-modulated carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting a resultant signal into a spatial transmission line, the transmitting apparatus comprising:

a reference position information signal generating means for generating a reference position information signal to decide a position of the reference carrier signal to be time-division multiplexed based on an interval setting input signal being supplied;

a packet signal generating means for receiving the reference position information signal and the information signal and then generating a packet signal by time-division multiplexing the received signals;

an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

2. An orthogonal frequency division multiplexed signal transmitting apparatus according to claim 1, wherein the interval setting input signal in the reference position information signal generating means is a signal that is obtained by receiving a signal being transmitted from an orthogonal frequency division multiplexed signal receiving apparatus that decides a transmitting interval of the reference carrier signals to transmit.

3. An orthogonal frequency division multiplexed signal transmitting/receiving system comprising:

an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and setting a transmitting interval of desired reference carrier signals that are digital-modulated at a predetermined time interval based on the reference signal point positions in the orthogonal frequency division multiplexed signal transmitting apparatus, and then transmitting set transmitting interval information of the reference carrier signals to the orthogonal frequency division multiplexed signal transmitting apparatus;

wherein the orthogonal frequency division multiplexed signal transmitting apparatus includes, a reference position information signal generating means for generating a reference position information signal to decide a position of the reference carrier signal to be time-division multiplexed based on the transmitted interval information of the reference carrier signal being transmitted from the orthogonal frequency division multiplexed signal receiving apparatus;

a packet signal generating means for receiving the reference position information signal and the information signal and then generating a packet signal by time-division multiplexing the received signals;

an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

4. An orthogonal frequency division multiplexed signal transmitting/receiving system comprising:

an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulation quality of the signal points of the reference signal points, which are obtained by the demodulation, or the signal points of the digital-modulated and orthogonal frequency division multiplexed carrier signals, which are obtained by the demodulation, to the orthogonal frequency division multiplexed signal transmitting apparatus;

wherein the orthogonal frequency division multiplexed signal transmitting apparatus includes, a reference position information signal generating means for deciding a transmitting interval of the reference carrier signals based on information about the demodulation quality being transmitted from the orthogonal frequency division multiplexed signal receiving apparatus, and then generating a reference position information signal based on the decided transmitting interval of the reference carrier signal;

a packet signal generating means for receiving the reference position information signal and the information signal and then generating a packet signal by time-division multiplexing the received signals;

an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

5. An orthogonal frequency division multiplexed signal transmitting apparatus according to claim 4, wherein the reference position information signal generating means analyzes a level difference of reference signals, which are transmitted from the orthogonal frequency division multiplexed signal receiving apparatus every transmitting interval as information concerning the demodulation quality, as positions of signal points on the two-dimensional plane, and then changes the transmitting interval of the reference carrier signals when a level difference signal obtained by analysis exceeds a predetermined range.

6. An orthogonal frequency division multiplexed signal transmitting/receiving system comprising:

an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulated quality of signal point of the reference signal points, which are obtained by the demodulation, or signal points of the carrier signals, which are digital-modulated and orthogonal frequency division multiplexed and then obtained by the demodulation; and an orthogonal frequency division multiplexed signal transmitting/receiving apparatus for deciding a transmitting interval of the reference carrier signals based on the information concerning the demodulation quality transmitted from the orthogonal frequency division multiplexed signal receiving apparatus, and then transmitting the decided transmitting interval information of the reference carrier signals;

wherein the orthogonal frequency division multiplexed signal transmitting apparatus includes, a reference position information signal generating means for generating a reference position information signal based on the transmitting interval information of the reference carrier signals being transmitted from the orthogonal frequency division multiplexed signal transmitting/receiving apparatus;

a packet signal generating means for receiving the reference position information signal and the information signal and then generating a packet signal by time-division multiplexing the received signals;

an orthogonal frequency division multiplexed signal generating means for receiving the packet signal generated by the packet signal generating means and then generating an orthogonal frequency division multiplexed signal by digital-modulating the plurality of carrier signals; and a high frequency signal processing means for executing a signal process to radiate the generated orthogonal frequency division multiplexed signal into the spatial transmission line.

7. An orthogonal frequency division multiplexed signal transmitting/receiving system comprising:

an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning the predetermined time interval, at which the reference carrier signals are to be transmitted, based on a demodulation quality of the reference signal points obtained by the demodulation to the orthogonal frequency division multiplexed signal transmitting apparatus;

wherein the orthogonal frequency division multiplexed signal receiving apparatus includes, a reference signal demodulating means for demodulating the received reference carrier signals to get the reference signal, and a reference signal analyzing means for analyzing the reference signal obtained by the reference signal demodulating means as positions of signal points on the two-dimensional plane, then deciding a predetermined time interval, at which the reference carrier signals is to be transmitted, based on a signal obtained by the analysis, and then supplying information based on the decided time interval.

8. An orthogonal frequency division multiplexed signal transmitting/receiving system comprising:

an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orgonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulation quality of the signal points of the reference signal points, which are obtained by the demodulation, or the signal points of the digital-modulated and orthogonal frequency division multiplexed carrier signals, which are obtained by the demodulation, to the orthogonal frequency division multiplexed signal transmitting apparatus;

wherein the orthogonal frequency division multiplexed signal receiving apparatus includes, a reference signal demodulating means for demodulating received reference carrier signals to get the reference signal, and a reference signal analyzing means for analyzing the reference signal obtained by the reference signal demodulating means as positions of signal points on the two-dimensional plane, then generating a demodulation quality information signal of the reference signal based on a signal obtained by the analysis, and then supplying the generated demodulation quality information signal.

9. An orthogonal frequency division multiplexed signal transmitting/receiving system comprising:

an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning the predetermined time interval, at which the reference carrier signals are to be transmitted, based on a demodulation quality of the reference signal points obtained by the demodulation to the orthogonal frequency division multiplexed signal transmitting apparatus;

wherein the orthogonal frequency division multiplexed signal receiving apparatus includes, a reference signal demodulating means for demodulating received reference carrier signals to get the reference signal, and a reference signal analyzing means for analyzing a level difference of the reference signal, which is demodulated at neighboring time intervals by the reference signal demodulating means, as positions of signal points on the two-dimensional plane, then generating information signal to change the predetermined time interval when a resultant analyzed level difference signal exceeds a predetermined range, and then supplying the generated information signal.

10. An orthogonal frequency division multiplexed signal transmitting/receiving system comprising:

an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a predetermined time interval, as reference carrier signals, and receiving the generated carrier signals and the generated reference carrier signals as a time-division multiplexed signal, and then transmitting the time-division multiplexed signal into a spatial transmission line; and an orthogonal frequency division multiplexed signal receiving apparatus for receiving the plurality of carrier signals and the reference carrier signals transmitted from the orthogonal frequency division multiplexed signal transmitting apparatus via the spatial transmission line, then demodulating the received resultant reference carrier signals, then demodulating the plurality of carrier signals based on information of the reference signal points obtained by the demodulation, and then obtaining the transmitted information signal by decoding based on signal point position information obtained by the demodulation, and transmitting information concerning demodulated quality of signal point of the reference signal points, which are obtained by the demodulation, or signal points of the carrier signals, which are digital-modulated and orthogonal frequency division multiplexed and then obtained by the demodulation; and an orthogonal frequency division multiplexed signal transmitting/receiving apparatus for deciding a transmitting interval of the reference carrier signals based on the information concerning the demodulation quality transmitted from the orthogonal frequency division multiplexed signal receiving apparatus, and then transmitting the decided transmitting interval information of the reference carrier signals to the orthogonal frequency division multiplexed signal transmitting apparatus;

wherein the orthogonal frequency division multiplexed signal transmitting/receiving apparatus includes, a reference signal analyzing means for analyzing demodulation quality information of the signal points supplied from the orthogonal frequency division multiplexed signal receiving apparatus to get an analyzed signal, and a reference signal position information transmitting means for deciding the transmitting interval of the reference carrier signals based on the analyzed signal obtained from the reference signal analyzing means, and then supplying a signal based on the decided transmitting interval information as a signal for transmission.

11. An orthogonal frequency division multiplexed signal receiving apparatus for receiving a signal transmitted from an orthogonal frequency division multiplexed signal transmitting apparatus for dividing a supplied information signal into a plurality of signals, then providing a plurality of carrier signals, each carrier signal being generated as a digital-modulated and orthogonal frequency division multiplexed carrier signal obtained by correlating predetermined digital signal values with a plurality of signal points decided on a two-dimensional plane that is defined by an in-phase axis and a quadrature axis, deciding positions, which have predetermined correspondences with positions of the plurality of signal points decided on the two-dimensional plane, as reference signal points, and then generating carrier signals, which are digital-modulated by the positions of the reference signal points at a time interval transmitted from an orthogonal frequency division multiplexed signal transmitting/receiving apparatus, as reference carrier signals, and receiving the generated carrier signals and the generated reference carrier signals as a time-division multiplexed signal, and then transmitting the time-division multiplexed signal into a spatial transmission line;

the receiving apparatus comprising:

a carrier signal demodulating means for obtaining the plurality of carrier signals and the reference carrier signals via the spatial transmission line to get demodulated output signals of respective carrier signals;

a reference signal level acquiring means for obtaining transmitting interval information of the reference carrier signal transmitted from the orthogonal frequency division multiplexed signal transmitting/receiving apparatus from the demodulated output signals obtained from the carrier signal demodulating means and then acquiring a demodulated signal level of the reference carrier signals contained in the demodulated output signals on the two-dimensional plane; and a demodulated signal decoding means for decoding the demodulated output signals obtained from the carrier signal demodulating means based on the demodulated signal level obtained by the reference signal level acquiring means.

* * * * *